United States Patent
Kuang et al.

(10) Patent No.: US 11,003,547 B2
(45) Date of Patent: May 11, 2021

(54) METHOD, APPARATUS AND COMPUTER PROGRAM PRODUCT FOR MANAGING DATA STORAGE

(71) Applicant: EMC IP Holding Company LLC, Hopkinton, MA (US)

(72) Inventors: Yaming Kuang, Shanghai (CN); Jun Liu, Shanghai (CN); Xiao Hua Fan, Shanghai (CN)

(73) Assignee: EMC IP Holding Company LLC, Hopkinton, MA (US)

(*) Notice: Subject to any disclaimer, the term of this patent is extended or adjusted under 35 U.S.C. 154(b) by 81 days.

(21) Appl. No.: 16/126,116

(22) Filed: Sep. 10, 2018

(65) Prior Publication Data

US 2020/0042399 A1 Feb. 6, 2020

(51) Int. Cl.
*G06F 11/14* (2006.01)

(52) U.S. Cl.
CPC ...... *G06F 11/1458* (2013.01); *G06F 11/1448* (2013.01); *G06F 2201/80* (2013.01); *G06F 2201/815* (2013.01); *G06F 2201/82* (2013.01)

(58) Field of Classification Search
CPC .......... G06F 11/1458; G06F 11/1448; G06F 2201/80; G06F 2201/815; G06F 2201/82
See application file for complete search history.

(56) References Cited

U.S. PATENT DOCUMENTS

| | | | | |
|---|---|---|---|---|
| 8,631,272 | B2* | 1/2014 | Prabhakaran | G06F 11/1662 710/114 |
| 9,081,771 | B1* | 7/2015 | Faibish | G06F 16/00 |
| 2002/0069313 | A1* | 6/2002 | Douniwa | G06F 11/1435 711/102 |
| 2005/0210218 | A1* | 9/2005 | Hoogterp | G06F 3/0613 711/203 |
| 2009/0300082 | A1* | 12/2009 | Chen | G06F 12/023 |
| 2011/0072199 | A1* | 3/2011 | Reiter | G06F 13/14 711/103 |
| 2014/0040540 | A1* | 2/2014 | Pruthi | G06F 3/0611 711/103 |
| 2017/0031940 | A1* | 2/2017 | Subramanian | G06F 16/13 |
| 2017/0300246 | A1* | 10/2017 | Michaeli | G06F 3/065 |

* cited by examiner

*Primary Examiner* — Kamini B Patel
*Assistant Examiner* — Kurosu Risa Altaf
(74) *Attorney, Agent, or Firm* — Krishnendu Gupta; Nikhil Patel

(57) ABSTRACT

There is disclosed techniques for managing data storage. In one embodiment, the techniques comprise recording index information in a block-based segment of a file system. The index information relates to an extent list in a virtual block map (VBM) pointing to the block-based segment. The techniques also comprise detecting an error in connection with the VBM. The techniques also comprise rebuilding the VBM based on the index information in response to detecting the error.

18 Claims, 7 Drawing Sheets

400 recording index information in a block-based segment of a file system, wherein the index information relates to an extent list in a virtual block map (VBM) pointing to the block-based segment
410 detecting an error in connection with the VBM
420 in response to detecting the error, rebuilding the VBM based on the index information
430

METHOD, APPARATUS AND COMPUTER PROGRAM PRODUCT FOR MANAGING DATA STORAGE

TECHNICAL FIELD

The present invention relates generally to data storage. More particularly, the present invention relates to a method, an apparatus and a computer program product for managing data storage.

BACKGROUND OF THE INVENTION

Computer systems may include different resources used by one or more host processors. Resources and host processors in a computer system may be interconnected by one or more communication connections. These resources may include, for example, data storage devices such as those included in the data storage systems manufactured by Dell EMC of Hopkinton, Mass. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

The accuracy and consistency of a file system is necessary to relate applications and data used by those applications. However, there may exist the potential for data corruption in any computer system and therefore measures are taken to periodically ensure that the file system is consistent and accurate. In a data storage system, hundreds of files may be created, modified, and deleted on a regular basis. Each time a file is modified, the data storage system performs a series of file system updates. These updates, when written to a disk storage reliably, yield a consistent file system. However, a file system can develop inconsistencies in several ways. Problems may result from an unclean shutdown, if a system is shut down improperly, or when a mounted file system is taken offline improperly. Inconsistencies can also result from defective hardware or hardware failures. Additionally, inconsistencies can also result from software errors or user errors.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

A file system checking (FSCK) utility provides a mechanism to help detect and fix inconsistencies in a file system. The FSCK utility verifies the integrity of the file system and optionally repairs the file system. In general, the primary function of the FSCK utility is to help maintain the integrity of the file system. The FSCK utility verifies the metadata of a file system, recovers inconsistent metadata to a consistent state and thus restores the integrity of the file system.

SUMMARY OF THE INVENTION

There is disclosed a method, comprising: recording index information in a block-based segment of a file system, wherein the index information relates to an extent list in a virtual block map (VBM) pointing to the block-based segment; detecting an error in connection with the VBM; and in response to detecting the error, rebuilding the VBM based on the index information.

There is also disclosed an apparatus, comprising: memory; and processing circuitry coupled to the memory, the memory storing instructions which, when executed by the processing circuitry, cause the processing circuitry to: record index information in a block-based segment of a file system, wherein the index information relates to an extent list in a virtual block map (VBM) pointing to the block-based segment; detect an error in connection with the VBM; and in response to detecting the error, rebuild the VBM based on the index information.

There is also disclosed a computer program product having a non-transitory computer readable medium which stores a set of instructions, the set of instructions, when carried out by processing circuitry, causing the processing circuitry to perform a method of: recording index information in a block-based segment of a file system, wherein the index information relates to an extent list in a virtual block map (VBM) pointing to the block-based segment; detecting an error in connection with the VBM; and in response to detecting the error, rebuilding the VBM based on the index information.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Figure 1:
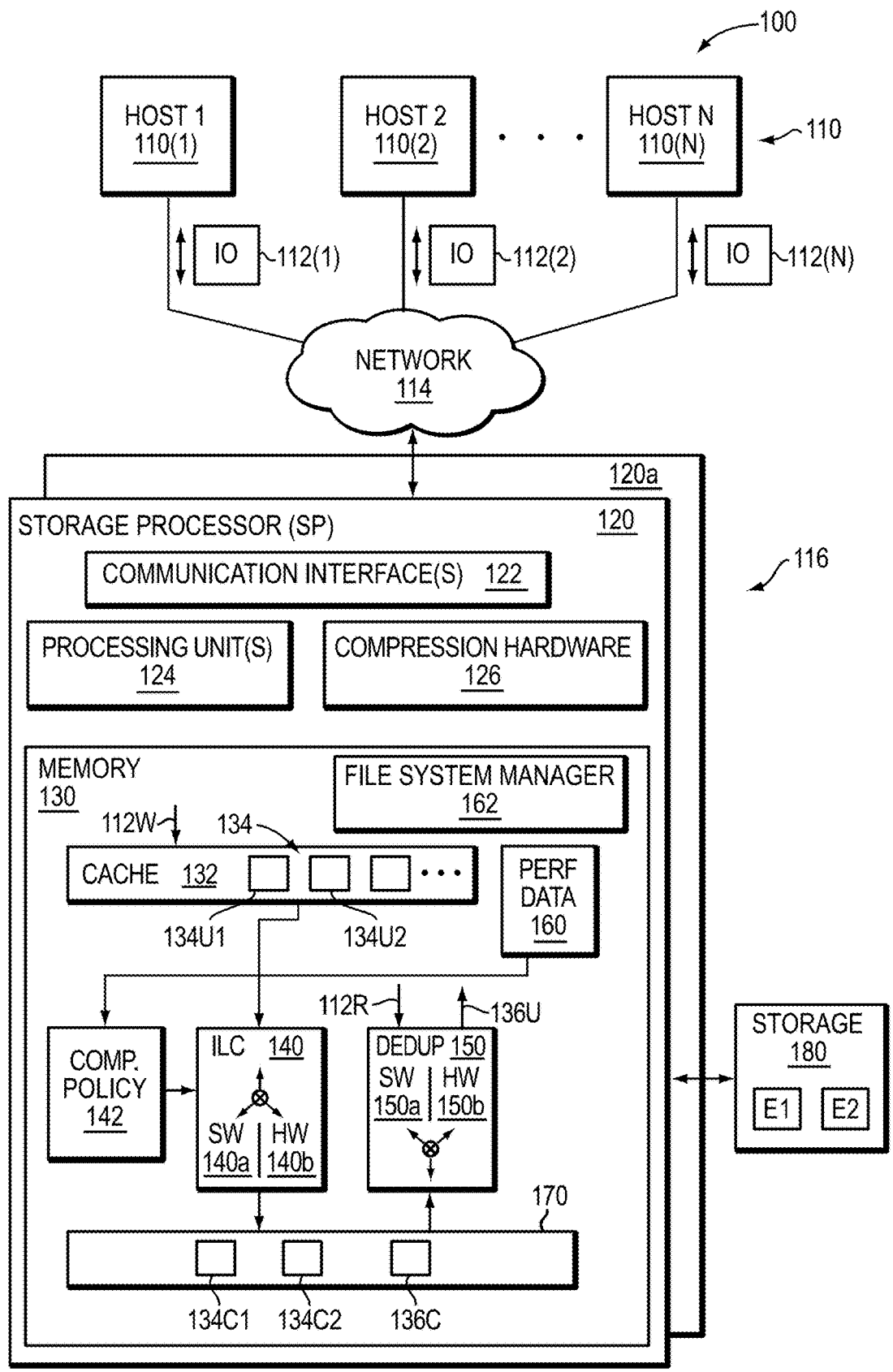
FIG. 1 is an example of an embodiment of a computer system that may utilize the techniques described herein.

Illustrative embodiments of the present disclosure will be described herein with reference to exemplary communication, storage and processing devices. It is to be appreciated, however, that the disclosure is not restricted to use with the particular illustrative configurations shown. Aspects of the disclosure provide methods and systems and computer program products for managing data storage.

Data reduction is an efficiency feature that allows users to store information using less storage capacity than storage capacity used without data reduction. Data storage systems often employ data reduction techniques, such as data compression, deduplication and/or pattern matching, to improve storage efficiency. With such data reduction, users can significantly increase storage utilization for data, such as file data and block data.

Data storage systems commonly arrange data in file systems, and file systems commonly store data, as well as metadata, in blocks. As is known, a "block" is the smallest unit of storage that a file system can allocate. Blocks for a given file system are generally of fixed size, such as 4 KB (kilobytes), 8 KB, or some other fixed size.

File systems typically categorize blocks as either allocated or free. Allocated blocks are those which are currently in use, whereas free blocks are those which are not currently in use. As a file system operates, the file system tends to allocate new blocks, to accommodate new data, but the file system also tends to generate new free blocks, as previously allocated blocks become free. The file system may run utilities (e.g., space maker, file system reorganizer) to coalesce ranges of contiguous free blocks. For example, a utility may move data found in allocated blocks between areas of the file system to create large regions of entirely free blocks. In various examples, the file system may return such regions of free blocks to a storage pool; the file system may also make such regions available to accommodate new writes of sequential data.

In a storage system enabled with inline data compression, data of the file system is generally compressed down to sizes smaller than a block and such compressed data is packed together in multi-block segments. Further, a file system manager may include a persistent file data cache (PFDC) aggregation logic that selects a set of allocation units (also referred to herein as "data fragments" or "storage extents" or "blocks") for compressing the set of allocation units and organizes the compressed allocation units in a segment. Further, each compressed allocation unit in a segment may also be simply referred to herein as a fragment. Thus, data of a file system may be stored in a set of segments. A segment may be composed from multiple contiguous blocks where data stored in the segment includes multiple compressed storage extents having various sizes.

Further, for each compressed storage extent in a segment of a file system, a corresponding weight is associated where the weight is arranged to indicate whether the respective storage extent is currently part of any file in the file system. In response to performing a file system operation that changes the weight of a storage extent in a segment of a file system to a value that indicates that the storage extent is no longer part of any file in the file system, the storage extent is marked as a free storage extent such that a scavenging utility can scavenge free space at a later time.

Described in following paragraphs are techniques that may be used in an embodiment in accordance with the techniques disclosed herein.

FIG. 1 depicts an example embodiment of a system 100 that may be used in connection with performing the techniques described herein. Here, multiple host computing devices ("hosts") 110, shown as devices 110(1) through 110(N), access a data storage system 116 over a network 114. The data storage system 116 includes a storage processor, or "SP," 120 and storage 180. In one example, the storage 180 includes multiple disk drives, such as magnetic disk drives, electronic flash drives, optical drives, and/or other types of drives. Such disk drives may be arranged in RAID (Redundant Array of Independent/Inexpensive Disks) groups, for example, or in any other suitable way.

In an example, the data storage system 116 includes multiple SPs, like the SP 120 (e.g., a second SP, 120a). The SPs may be provided as circuit board assemblies, or "blades," that plug into a chassis that encloses and cools the SPs. The chassis may have a backplane for interconnecting the SPs, and additional connections may be made among SPs using cables. No particular hardware configuration is required, however, as any number of SPs, including a single SP, may be provided and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI (Internet Small Computer Systems interface), NFS (Network File System), SMB (Server Message Block) 3.0, and CIFS (Common Internet File System), for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to block-based and/or file-based protocols and to respond to such IO requests 112(1-N) by reading and/or writing the storage 180.

As further shown in FIG. 1, the SP 120 includes one or more communication interfaces 122, a set of processing units 124, compression hardware 126, and memory 130. The communication interfaces 122 may be provided, for example, as SCSI target adapters and/or network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs.

The compression hardware 126 includes dedicated hardware, e.g., one or more integrated circuits, chipsets, subassemblies, and the like, for performing data compression and decompression in hardware. The hardware is "dedicated" in that it does not perform general-purpose computing but rather is focused on compression and decompression of data. In some examples, compression hardware 126 takes the form of a separate circuit board, which may be provided as a daughterboard on SP 120 or as an independent assembly that connects to the SP 120 over a backplane, midplane, or set of cables, for example. A non-limiting example of compression hardware 126 includes the Intel® QuickAssist Adapter, which is available from Intel Corporation of Santa Clara, Calif.

The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by execution of software instructions, a cache 132, an inline compression (ILC) engine 140, a deduplication engine 150, and a data object 170. A compression policy 142 provides control input to the ILC engine 140. The deduplication engine 150 optionally performs deduplication by determining if a first allocation unit of data in the storage system matches a second allocation unit of data. When a match is found, the leaf pointer for the first allocation unit is replaced with a deduplication pointer to the leaf pointer of the second allocation unit.

In addition, the memory 130 may also optionally includes an inline decompression engine (not shown) and a decompression policy (not shown), as would be apparent to a person of ordinary skill in the art. Both the compression policy 142 and the decompression policy receive performance data 160, that describes a set of operating conditions in the data storage system 116.

In an example, the data object 170 is a host-accessible data object, such as a LUN, a file system, or a virtual machine disk (e.g., a VVol (Virtual Volume), available from VMWare, Inc. of Palo Alto, Calif. The SP 120 exposes the data object 170 to hosts 110 for reading, writing, and/or other data operations. In one particular, non-limiting example, the SP 120 runs an internal file system and implements the data object 170 within a single file of that file system. In such an example, the SP 120 includes mapping (not shown) to convert read and write requests from hosts 110 (e.g., 10 requests 112(1-N)) to corresponding reads and writes to the file in the internal file system.

As further shown in FIG. 1, ILC engine 140 includes a software component (SW) 140a and a hardware component (HW) 140b. The software component 140a includes a compression method, such as an algorithm, which may be implemented using software instructions. Such instructions may be loaded in memory and executed by processing units 124, or some subset thereof, for compressing data directly, i.e., without involvement of the compression hardware 126. In comparison, the hardware component 140b includes software constructs, such as a driver and API (application programmer interface) for communicating with compression hardware 126, e.g., for directing data to be compressed by the compression hardware 126. In some examples, either or both components 140a and 140b support multiple compression algorithms. The compression policy 142 and/or a user may select a compression algorithm best suited for current operating conditions, e.g., by selecting an algorithm that produces a high compression ratio for some data, by selecting an algorithm that executes at high speed for other data, and so forth.

For deduplicating data, the deduplication engine 150 includes a software component (SW) 150a and a hardware component (HW) 150b. The software component 150a includes a deduplication algorithm implemented using software instructions, which may be loaded in memory and executed by any of processing units 124 for deduplicating data in software. The hardware component 150b includes software constructs, such as a driver and API for communicating with optional deduplication hardware (not shown), e.g., for directing data to be deduplicated by the deduplication hardware. Either or both components 150a and 150b may support multiple deduplication algorithms. In some examples, the ILC engine 140 and the deduplication engine 150 are provided together in a single set of software objects, rather than as separate objects, as shown.

In one example operation, hosts 110(1-N) issue IO requests 112(1-N) to the data storage system 116 to perform reads and writes of data object 170. SP 120 receives the IO requests 112(1-N) at communications interface(s) 122 and passes them to memory 130 for further processing. Some IO requests 112(1-N) specify data writes 112W, and others specify data reads 112R, for example. Cache 132 receives write requests 112W and stores data specified thereby in cache elements 134. In a non-limiting example, the cache 132 is arranged as a circular data log, with data elements 134 that are specified in newly-arriving write requests 112W added to a head and with further processing steps pulling data elements 134 from a tail. In an example, the cache 132 is implemented in DRAM (Dynamic Random Access Memory), the contents of which are mirrored between SPs 120 and 120a and persisted using batteries. In an example, SP 120 may acknowledge writes 112W back to originating hosts 110 once the data specified in those writes 112W are stored in the cache 132 and mirrored to a similar cache on SP 120a. It should be appreciated that the data storage system 116 may host multiple data objects, i.e., not only the data object 170, and that the cache 132 may be shared across those data objects.

When the SP 120 is performing writes, the ILC engine 140 selects between the software component 140a and the hardware component 140b based on input from the compression policy 142. For example, the ILC engine 140 is configured to steer incoming write requests 112W either to the software component 140a for performing software compression or to the hardware component 140b for performing hardware compression.

In an example, cache 132 flushes to the respective data objects, e.g., on a periodic basis. For example, cache 132 may flush a given uncompressed element 134U1 to data object 170 via ILC engine 140. In accordance with compression policy 142, ILC engine 140 selectively directs data in element 134U1 to software component 140a or to hardware component 140b. In this example, compression policy 142 selects software component 140a. As a result, software component 140a receives the data of element 134U1 and applies a software compression algorithm to compress the data. The software compression algorithm resides in the memory 130 and is executed on the data of element 134U1 by one or more of the processing units 124. Software component 140a then directs the SP 120 to store the resulting compressed data 134C1 (the compressed version of the data in element 134U1) in the data object 170. Storing the compressed data 134C1 in data object 170 may involve both storing the data itself and storing any metadata structures required to support the data 134C1, such as block pointers, a compression header, and other metadata.

It should be appreciated that this act of storing data 134C1 in data object 170 provides the first storage of such data in the data object 170. For example, there was no previous storage of the data of element 134U1 in the data object 170. Rather, the compression of data in element 134U1 proceeds "inline," in one or more embodiments, because it is conducted in the course of processing the first write of the data to the data object 170.

Continuing to another write operation, cache 132 may proceed to flush a given element 134U2 to data object 170 via ILC engine 140, which, in this case, directs data compression to hardware component 140b, again in accordance with policy 142. As a result, hardware component 140b directs the data in element 134U2 to compression hardware 126, which obtains the data and performs a high-speed hardware compression on the data. Hardware component 140b then directs the SP 120 to store the resulting compressed data 134C2 (the compressed version of the data in element 134U2) in the data object 170. Compression of data in element 134U2 also takes place inline, rather than in the background, as there is no previous storage of data of element 134U2 in the data object 170.

In an example, directing the ILC engine 140 to perform hardware or software compression further entails specifying a particular compression algorithm. The algorithm to be used in each case is based on compression policy 142 and/or specified by a user of the data storage system 116. Further, it should be appreciated that compression policy 142 may operate ILC engine 140 in a pass-through mode, i.e., one in which no compression is performed. Thus, in some examples, compression may be avoided altogether if the SP 120 is too busy to use either hardware or software compression.

In some examples, storage 180 is provided in the form of multiple extents, with two extents E1 and E2 particularly shown. In an example, the data storage system 116 monitors a "data temperature" of each extent, i.e., a frequency of read and/or write operations performed on each extent, and selects compression algorithms based on the data temperature of extents to which writes are directed. For example, if extent E1 is "hot," meaning that it has a high data temperature, and the data storage system 116 receives a write directed to E1, then compression policy 142 may select a compression algorithm that executes at a high speed for compressing the data directed to E1. However, if extent E2 is "cold," meaning that it has a low data temperature, and the data storage system 116 receives a write directed to E2, then compression policy 142 may select a compression algorithm that executes at high compression ratio for compressing data directed to E2.

With the arrangement of FIG. 1, the SP 120 intelligently directs compression and other data reduction tasks to software or to hardware based on operating conditions in the data storage system 116. For example, if the set of processing units 124 are already busy but the compression hardware 126 is not, the compression policy 142 can direct more compression tasks to hardware component 140b. Conversely, if compression hardware 126 is busy but the set of processing units 124 are not, the compression policy 142 can direct more compression tasks to software component 140a. Decompression policy may likewise direct decompression tasks based on operating conditions, at least to the extent that direction to hardware or software is not already dictated by the algorithm used for compression. In this manner, the data storage system 116 is able to perform inline compression using both hardware and software techniques, leveraging the capabilities of both while applying them in proportions that result in best overall performance.

In such an embodiment in which element 120 of FIG. 1 is implemented using one or more data storage systems, each of the data storage systems may include code thereon for performing the techniques as described herein.

Servers or host systems, such as 110(1)-110(N), provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN may be used to refer to the foregoing logically defined devices or volumes.

The data storage system may be a single unitary data storage system, such as single data storage array, including two storage processors or compute processing units. Techniques herein may be more generally used in connection with any one or more data storage systems each including a different number of storage processors than as illustrated herein. The data storage system 116 may be a data storage array, such as a Unity™, a VNX™ or VNXe™ data storage array by Dell EMC of Hopkinton, Mass., including a plurality of data storage devices 116 and at least two storage processors 120a. Additionally, the two storage processors 120a may be used in connection with failover processing when communicating with a management system for the storage system. Client software on the management system may be used in connection with performing data storage system management by issuing commands to the data storage system 116 and/or receiving responses from the data storage system 116 over a connection. In one embodiment, the management system may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

In some arrangements, the data storage system 116 provides block-based storage by storing the data in blocks of logical storage units (LUNs) or volumes and addressing the blocks using logical block addresses (LBAs). In other arrangements, the data storage system 116 provides file-based storage by storing data as files of a file system and locating file data using inode structures. In yet other arrangements, the data storage system 116 stores LUNs and file systems, stores file systems within LUNs, and so on.

As further shown in FIG. 1, the memory 130 includes a file system and a file system manager 162. A file system is implemented as an arrangement of blocks, which are organized in an address space. Each of the blocks has a location in the address space, identified by FSBN (file system block number). Further, such address space in which blocks of a file system are organized may be organized in a logical address space where the file system manager 162 further maps respective logical offsets for respective blocks to physical addresses of respective blocks at specified FSBNs. In some cases, data to be written to a file system are directed to blocks that have already been allocated and mapped by the file system manager 162, such that the data writes prescribe overwrites of existing blocks. In other cases, data to be written to a file system do not yet have any associated physical storage, such that the file system must allocate new blocks to the file system to store the data. Further, for example, FSBN may range from zero to some large number, with each value of FSBN identifying a respective block location. The file system manager 162 performs various processing on a file system, such as allocating blocks, freeing blocks, maintaining counters, and scavenging for free space.

In at least one embodiment of the current technique, an address space of a file system may be provided in multiple ranges, where each range is a contiguous range of FSBNs (File System Block Number) and is configured to store blocks containing file data. In addition, a range includes file system metadata, such as inodes, indirect blocks (IBs), and virtual block maps (VBMs), for example, as discussed further below in conjunction with FIG. 2. As is known, inodes are metadata structures that store information about files and may include pointers to IBs. IBs include pointers that point either to other IBs or to data blocks. IBs may be arranged in multiple layers, forming IB trees, with leaves of the IB trees including block pointers that point to data blocks. Together, the leaf IB's of a file define the file's logical address space, with each block pointer in each leaf IB specifying a logical address into the file. Virtual block maps (VBMs) are structures placed between block pointers of leaf IBs and respective data blocks to provide data block virtualization. The term "VBM" as used herein describes a metadata structure that has a location in a file system that can be pointed to by other metadata structures in the file system and that includes a block pointer to another location in a file system, where a data block or another VBM is stored. However, it should be appreciated that data and metadata may be organized in other ways, or even randomly, within a file system. The particular arrangement described above herein is intended merely to be illustrative.

Further, in at least one embodiment of the current technique, ranges associated with an address space of a file system may be of any size and of any number. In some examples, the file system manager 162 organizes ranges in a hierarchy. For instance, each range may include a relatively small number of contiguous blocks, such as 16 or 32 blocks, for example, with such ranges provided as leaves of a tree. Looking up the tree, ranges may be further organized in CG (cylinder groups), slices (units of file system provisioning, which may be 256 MB or 1 GB in size, for example), groups of slices, and the entire file system, for example. Although ranges as described above herein apply to the lowest level of the tree, the term "ranges" as used herein may refer to groupings of contiguous blocks at any level.

In at least one embodiment of the technique, hosts 110 (1-N) issue IO requests 112(1-N) to the data storage system 116. The SP 120 receives the IO requests 112(1-N) at the communication interfaces 122 and initiates further processing. Such processing may include, for example, performing read and write operations on a file system, creating new files in the file system, deleting files, and the like. Over time, a file system changes, with new data blocks being allocated and allocated data blocks being freed. In addition, the file system manager 162 also tracks freed storage extents. In an example, storage extents are versions of block-denominated data, which are compressed down to sub-block sizes and packed together in multi-block segments. Further, a file system operation may cause a storage extent in a range to be freed, e.g., in response to a punch-hole or write-split operation. Further, a range may have a relatively large number of freed fragments but may still be a poor candidate for free-space scavenging if it has a relatively small number of allocated blocks. With one or more candidate ranges identified, the file system manager 162 may proceed to perform free-space scavenging on such range or ranges. Such scavenging may include, for example, liberating unused blocks from segments (e.g., after compacting out any unused portions), moving segments from one range to another to create free space, and coalescing free space to support contiguous writes and/or to recycle storage resources by returning such resources to a storage pool. Thus, file system manager 162 may scavenge free space, such as by performing garbage collection, space reclamation, and/or free-space coalescing.

In at least one embodiment, the data storage system 116 may further comprise a space savings accounting module that implements a data reduction monitoring and reporting technique. As discussed above, the exemplary deduplication engine 150 optionally performs deduplication by determining if a first allocation unit of data in the storage system matches a second allocation unit of data by comparing SHA (Secure Hash Algorithm) hash values of the allocation units. For example, when a match is found, the deduplication engine 150 may replace the leaf pointer for the first allocation unit with a deduplication pointer to the leaf pointer of the second allocation unit. One or more space savings counters may be optionally incremented, for example, by the space savings accounting module. The hash values of each (or, alternatively, the top N) original previously processed allocation units may also be stored.

As noted above, in at least one embodiment, the data storage system 116 may maintain a number of space savings counters and metrics to report data reduction space savings. In some embodiments, compression and deduplication data reductions may be reported separately and/or in combination. For example, the data reduction savings attributed to compression can be reported independently of the data reduction attributed to deduplication. In addition, data reduction savings attributed to deduplication can be reported independently of the data reduction attributed to compression. For example, the data reduction attributed to deduplication may be obtained by determining a difference between (i) a total number of pointers comprised of a sum of a number of leaf pointers and a number of deduplication pointers, and (ii) the number of leaf pointers.

Figure 2:
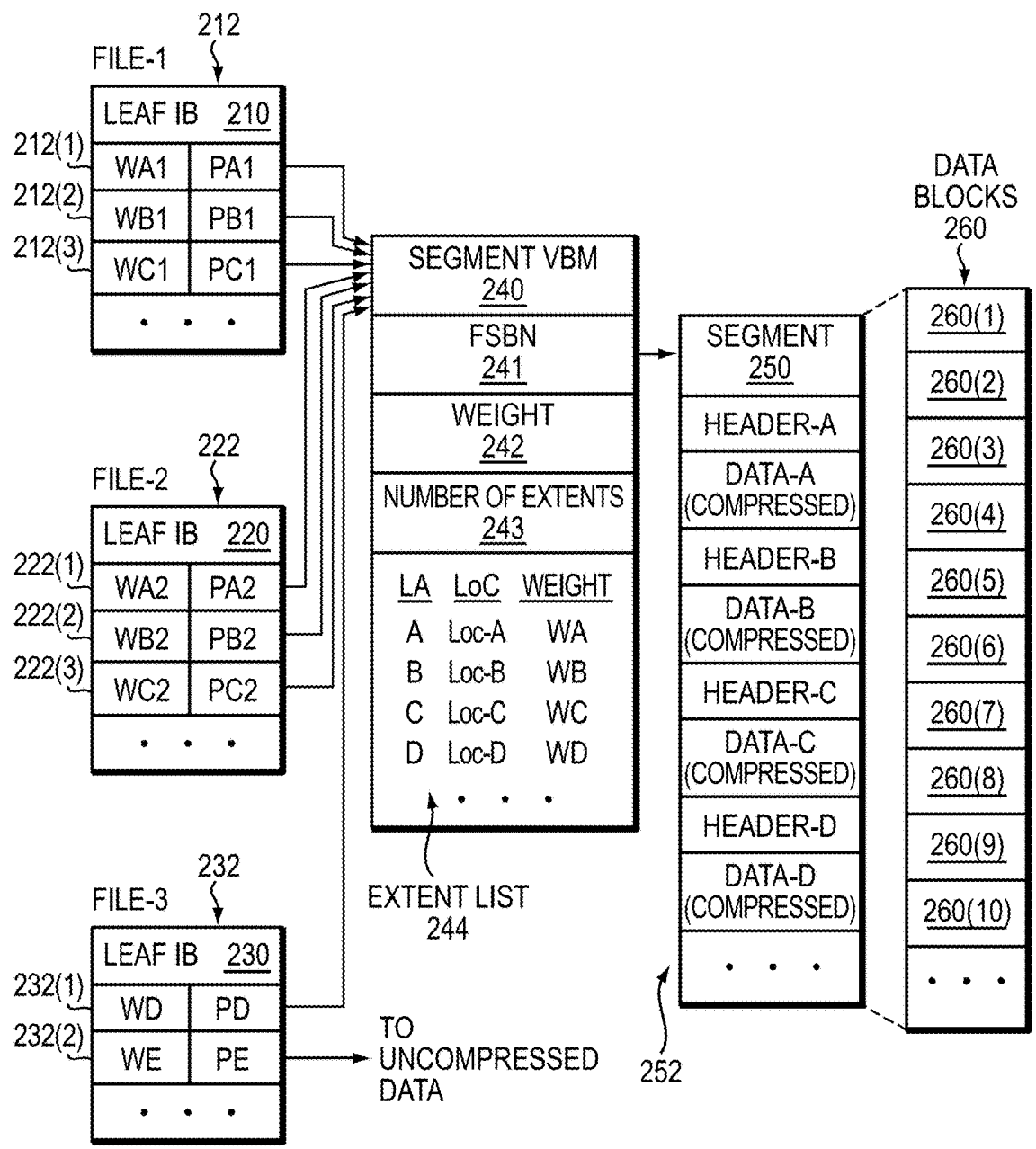
FIG. 2 illustrate in further detail components that may be used in connection with the techniques described herein, according to one embodiment of the disclosure.

FIG. 2 illustrates a more detailed representation of components that may be included in an embodiment using the techniques herein. As shown in FIG. 2, a segment 250 that stores data of a file system is composed from multiple data blocks 260. Here, exemplary segment 250 is made up of at least ten data blocks 260(1) through 260(10); however, the number of data blocks per segment may vary. In an example, the data blocks 260 are contiguous, meaning that they have consecutive FSBNs in a file system address space for the file system. Although segment 250 is composed from individual data blocks 260, the file system treats the segment 250 as one continuous space. Compressed storage extents 252, i.e., Data-A through Data-D, etc., are packed inside the segment 250. In an example, each of storage extents 252 is initially a block-sized set of data, which has been compressed down to a smaller size. An 8-block segment may store the compressed equivalent of 12 or 16 blocks or more of uncompressed data, for example. The amount of compression depends on the compressibility of the data and the particular compression algorithm used. Different compressed storage extents 252 typically have different sizes. Further, for each storage extent 252 in the segment 250, a corresponding weight is maintained, the weight arranged to indicate whether the respective storage extent 252 is currently part of any file in a file system by indicating whether other block pointers in the file system point to that block pointer.

The segment 250 has an address (e.g., FSBN 241) in the file system, and a segment VBM (Virtual Block Map) 240 points to that address. For example, segment VBM 240 stores a segment pointer 241, which stores the FSBN of the segment 250. By convention, the FSBN of segment 250 may be the FSBN of its first data block, i.e., block 260(1). Although not shown, each block 260(1)-260(10) may have its respective per-block metadata (BMD), which acts as representative metadata for the respective, block 260(1)-260(10), and which includes a backward pointer to the segment VBM 240.

As further shown in FIG. 2, the segment VBM 240 stores information regarding the number of extents 243 in the segment 250 and an extent list 244. The extent list 244 acts as an index into the segment 250, by associating each compressed storage extent 252, identified by logical address (e.g., LA values A through D, etc.), with a corresponding location within the segment 250 (e.g., Location values Loc-A through Loc-D, etc., which indicate physical offsets) and a corresponding weight (e.g., Weight values WA through WD, etc.). The weights provide indications of whether the associated storage extents are currently in use by any files in the file system. For example, a positive number for a weight may indicate that at least one file in the file system references the associated storage extent 252. Conversely, a weight of zero may mean that no file in the file system currently references that storage extent 252. It should be appreciated, however, that various numbering schemes for reference weights may be used, such that positive numbers could easily be replaced with negative numbers and zero could easily be replaced with some different baseline value. The particular numbering scheme described herein is therefore intended to be illustrative rather than limiting.

In an example, the weight (e.g., Weight values WA through WD, etc.) for a storage extent 252 reflects a sum, or "total distributed weight," of the weights of all block pointers in the file system that point to the associated storage extent. In addition, the segment VBM 240 may include an overall weight 242, which reflects a sum of all weights of all block pointers in the file system that point to extents tracked by the segment VBM 240. Thus, in general, the value of overall weight 242 should be equal to the sum of all weights in the extent list 242.

Various block pointers 212, 222, and 232 are shown to the left in FIG. 2. In an example, each block pointer is disposed within a leaf IB (Indirect Block), also referred to herein as a mapping pointer (MP), which performs mapping of logical addresses for a respective file to corresponding physical addresses in the file system. Here, leaf IB 210 is provided for mapping data of a first file (F1) and contains block pointers 212(1) through 212(3). Also, leaf IB 220 is provided for mapping data of a second file (F2) and contains block pointers 222(1) through 222(3). Further, leaf IB 230 is provided for mapping data of a third file (F3) and contains block pointers 232(1) and 232(2). Each of leaf IBs 210, 220, and 230 may include any number of block pointers, such as 1024 block pointers each; however, only a small number are shown for ease of illustration. Although a single leaf IB 210 is shown for file-1, the file-1 may have many leaf IBs, which may be arranged in an IB tree for mapping a large logical address range of the file to corresponding physical addresses in a file system to which the file belongs. A "physical address" is a unique address within a physical address space of the file system.

Each of block pointers 212, 222, and 232 has an associated pointer value and an associated weight. For example, block pointers 212(1) through 212(3) have pointer values PA1 through PC1 and weights WA1 through WC1, respectively, block pointers 222(1) through 222(3) have pointer values PA2 through PC2 and weights WA2 through WC2, respectively, and block pointers 232(1) through 232(2) have pointer values PD through PE and weights WD through WE, respectively.

Regarding files F1 and F2, pointer values PA1 and PA2 point to segment VBM 240 and specify the logical extent for Data-A, e.g., by specifying the FSBN of segment VBM 240 and an offset that indicates an extent position. In a like manner, pointer values PB1 and PB2 point to segment VBM 240 and specify the logical extent for Data-B, and pointer values PC1 and PC2 point to segment VBM 240 and specify the logical extent for Data-C. It can thus be seen that block pointers 212 and 222 share compressed storage extents Data-A, Data-B, and Data-C. For example, files F1 and F2 may be snapshots in the same version set. Regarding file F3, pointer value PD points to Data-D stored in segment 250 and pointer value PE points to Data-E stored outside the segment 250. File F3 does not appear to have a snapshot relationship with either of files F1 or F2. If one assumes that data block sharing for the storage extents 252 is limited to that shown, then, in an example, the following relationships may hold:

$WA=WA1+WA2;$ $WB=WB1+WB2;$ $WC=WC1+WC2;$ $WD=WD;$ and

Weight $242=\Sigma Wi$ (for $i=a$ through $d$, plus any additional extents 252 tracked by extent list 244).

The detail shown in segment 450 indicates an example layout 252 of data items. In at least one embodiment of the current technique, each compression header is a fixed-size data structure that includes fields for specifying compression parameters, such as compression algorithm, length, CRC (cyclic redundancy check), and flags. In some examples, the header specifies whether the compression was performed in hardware or in software. Further, for instance, Header-A can be found at Loc-A and is immediately followed by compressed Data-A. Likewise, Header-B can be found at Loc-B and is immediately followed by compressed Data-B. Similarly, Header-C can be found at Loc-C and is immediately followed by compressed Data-C.

For performing writes, the ILC engine 140 generates each compression header (Header-A, Header-B, Header-C, etc.) when performing compression on data blocks 260, and directs a file system to store the compression header together with the compressed data. The ILC engine 140 generates different headers for different data, with each header specifying a respective compression algorithm. For performing data reads, a file system looks up the compressed data, e.g., by following a pointer 212, 222, 232 in the leaf IB 210, 220, 230 to the segment VBM 240, which specifies a location within the segment 250. A file system reads a header at the specified location, identifies the compression algorithm that was used to compress the data, and then directs the ILDC engine to decompress the compressed data using the specified algorithm.

In at least one embodiment of the current technique, for example, upon receiving a request to overwrite and/or update data of data block (Data-D) pointed to by block pointer 232(a), a determination is made as to whether the data block (Data-D) has been shared among any other file. Further, a determination is made as to whether the size of the compressed extent (also referred to herein as "allocation unit") storing contents of Data-D in segment 250 can accommodate the updated data. Based on the determination, the updated data is written in a compressed format to the compressed extent for Data-D in the segment 250 instead of allocating another allocation unit in a new segment.

For additional details regarding the data storage system of FIGS. 1 and 2, see, for example, U.S. patent application Ser. No. 15/393,331, filed Dec. 29, 2016, entitled "Managing Inline Data Compression in Storage Systems,", incorporated by reference herein in its entirety.

It should, however, be noted that an inline deduplication enabled file system having at least some of the above components may encounter a data mismatch (DMC) scenario when FSR is running in background and later there is a FSCK procedure performed in connection with the file system. The root cause of the DMC relates to ILD FSR compaction and the index (idx) information related to the compacted blocks being lost. As discussed above, FSR refers to a filesystem reorganizer which provides the functionality to reclaim space from the filesystem. Later, if the file system is offline because a VBM needs to be rebuilt (either because of VBM lost write or VBM internal CRC mismatch), FSCK will rebuild the extents based on the sequence the data blocks appears in ZipHeader, which is not correct after compaction. This will be described further below.

Figure 3A:
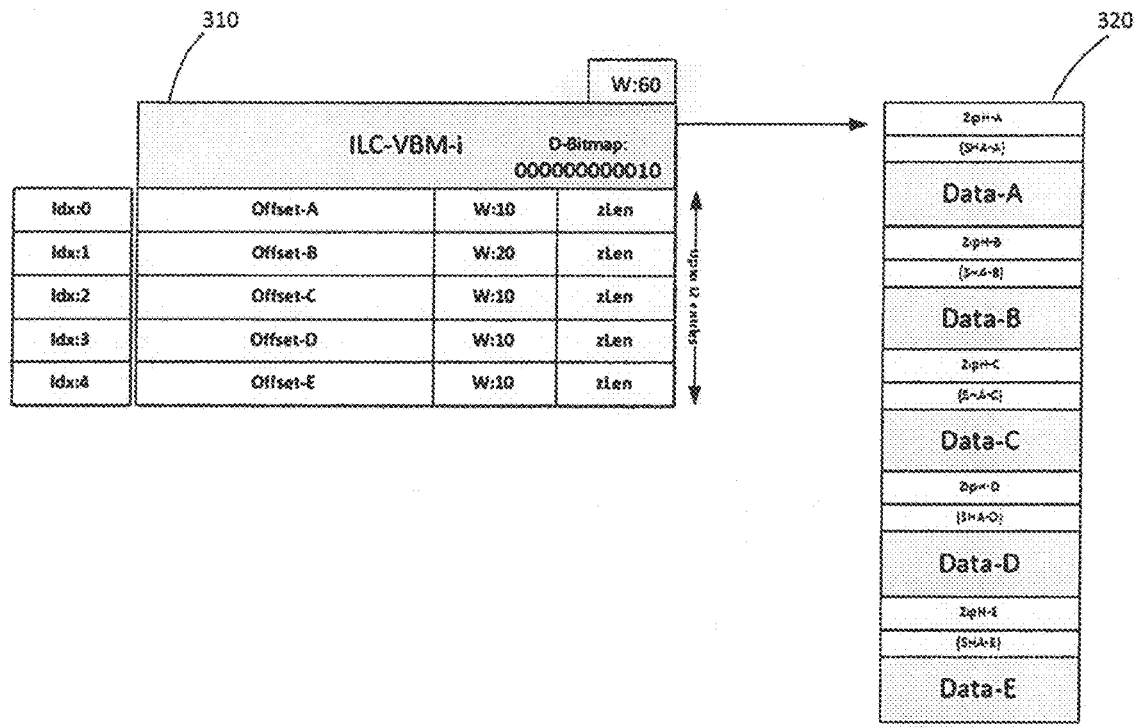
FIGS. 3A-3D illustrates in further detail components that may be used in connection with the techniques described herein, according to one embodiment of the disclosure.

FIGS. 3A-3D illustrate a more detailed representation of components that may be included in an embodiment using the techniques herein. In this particular embodiment, the figures illustrate various stages of managing data storage in a file system containing components similar to those described in FIG. 2. Turning initially to FIG. 3A, the figure illustrates a VBM 310 (referred to as ILC-VBM-I in the figure) and a segment 320 similar to the corresponding features in FIG. 2. However, in this particular embodiment, the figure omits the leaf IBs for ease of illustration. The VBM 310 comprises an extent list with each entry in the list containing offset, weight, and zLen fields. The VBM 310 also comprises an index in connection with the extent list (i.e., idx: 0 corresponds to the first entry in the extent list, idx: 1 corresponds to the second entry in the extent list, etc.).

Additionally, as discussed above, the weight in the extent list for a storage extent reflects a sum, or "total distributed weight," of the weights of all block pointers or mapping pointers (MPs) in the file system that point to the associated storage extent. For example, in this particular embodiment, the weight field in the extent list in the VBM 310 includes weights of 10 to indicate that one MP points to each of A, C, D and E. Additionally, the weight field in the extent list in the VBM 310 includes a weight of 20 to indicate that a deduplication MP also points to B. It should be understood that in this particular embodiment the offset-B comprises a weight 20 to indicate a deduplication MP B1 is deduplicated to offset-B. The zLen describes the length of the compressed area in the segment 320 (e.g., zLen=length(ZipHeader+SHA+Data)).

In this particular embodiment, the segment 320 comprises a ZipHeader and a digest (SHA) to enable it to maintain extra data describing the compressed data. For example, as discussed above, the ZipHeader may contain information about the size of the compressed data, the compression method it used, the CRC for the validation of header, etc. The digest (SHA) may represent a fingerprint of original uncompressed allocation unit (AU) to enable the system to judge if AUs have the same data and can be deduplicated. As illustrated, the segment 320 comprises 5 AU compressed and written together. For example, the "A" AU is compressed and represented by ZipH-A+SHA-A+Data-A. The other 4 AUs are also similarly represented in the figure.

The VBM 310 also comprises a bitmap in a VBM header to assist with a rebuild. In at least one embodiment, a D-bitmap having 12 bits is included in a VBM header with each bit representing whether an extent has been involved with deduplication (i.e., there is some MP deduplication to this extent). The D-bitmap in the VBM header assists the FSCK to detect any extent uniquely owned by MPs with same offset stored in the extent such that the FSCK can pick up and do reconnect of these MPs. For those extents with d-bit map in D-bitmap, the FSCK will not reconnect any of these MPs because any MP associated with any possible offset could be a candidate to map to this extent. As a result, the FSCK will have no choice but to mark them as all BAD since the FSCK can't distinguish who should point to which extent.

Additionally, in some embodiments, another bitmap may be used in IB's BMD which is a region bitmap. In at least one embodiment, a bit is set in the bitmap when there is an MP being written and this MP is deduplicated to some extent. In one embodiment, the bitmap describes for multiple occurrences of one or more parts of the file system block whether the respective one or more parts are associated with deduplication. For example, the bitmap may be 16 bits, each bit tracking 64 MPs. As a result, the FSCK may be able to safely convert appropriate MPs to holes (e.g., a hole may be a file system block address that have not be written yet or a block address that has been written before but later truncated by the user) if the bits in the region bitmap are not set but leave those MPs as BAD (e.g., BAD MP is set by file system due to some unrecoverable situations, any user read to these BAD MP will be returned with I/O error (file system still online), any user write to the BAD MP won't matter since it will overwrite the MP with a new block address) for which region the bit has not been set.

For additional details regarding the bitmap and the said use of the bitmap, see, for example, U.S. patent application Ser. No. 15/887,068, filed Feb. 2, 2018, entitled "METHOD, APPARATUS AND COMPUTER PROGRAM PRODUCT FOR MANAGING DATA INCONSISTENCIES IN FILE SYSTEMS", and U.S. patent application Ser. No. 16/054,216, filed Aug. 3, 2018, entitled "METHOD, APPARATUS AND COMPUTER PROGRAM PRODUCT FOR MANAGING DATA STORAGE", both incorporated by reference herein in their entirety.

Figure 3B:
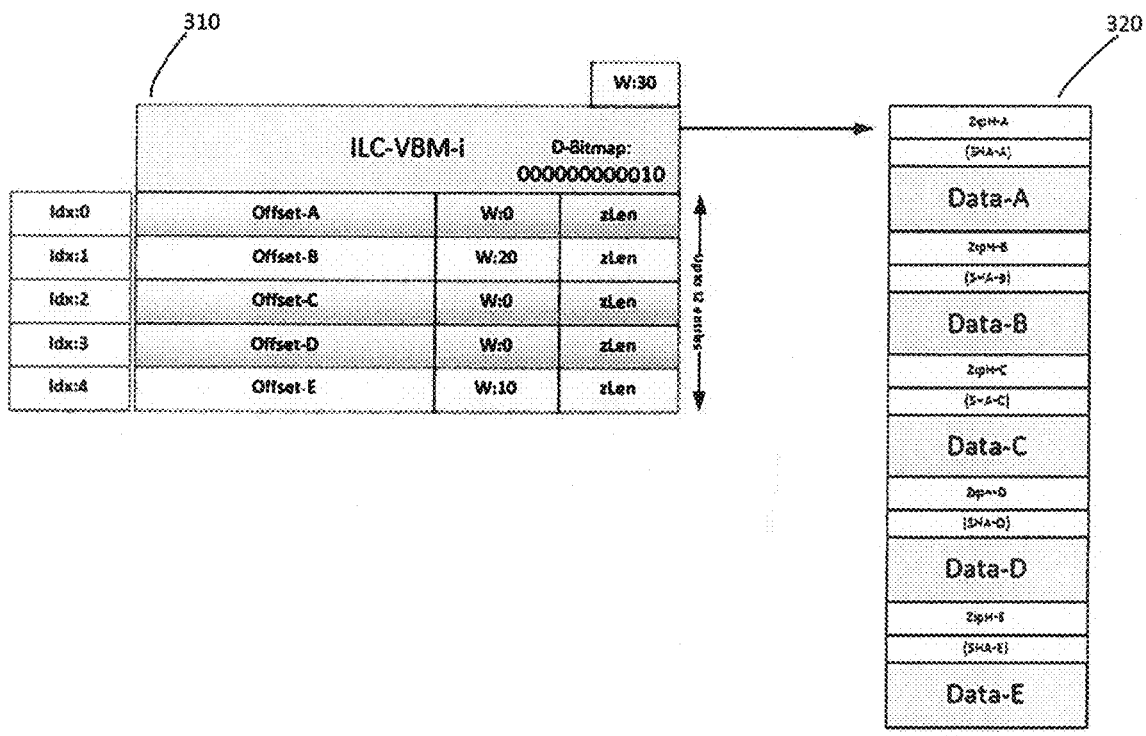

FIG. 3B illustrates another stage in managing data storage in the file system. In this particular embodiment, the figure illustrates the layout of VBM 310 and the segment 320 after truncation to Offset-A, Offset-C and Offset D. In this particular embodiment, to truncate MP Offset-A, Offset-C and Offset D means the appropriate weight fields of the extent list are set to zero so there is no MPs referencing this AU and the storage can then be freed. It should be understood that this may happen when a user want to zero-fill the offset-A/C/D or truncate the file.

Figure 3C:
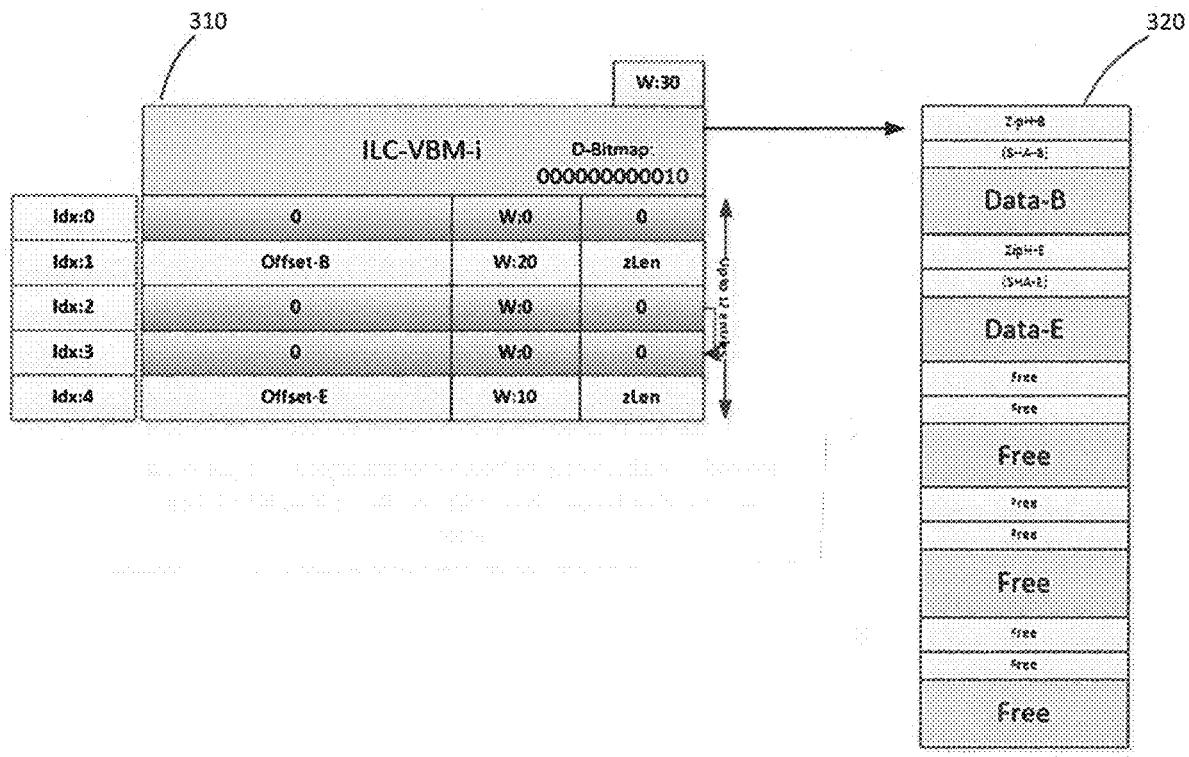

FIG. 3C illustrates another stage in managing data storage in the file system. In this particular embodiment, the figure illustrates the layout of VBM 310 and the segment 320 in response to the deployment of ILD FSR. In this particular embodiment, and as illustrated in the figure, the ILD FSR involves FSR compaction and is deployed after the truncation described in the previous figure. Here, the ILD FSR causes the respective offset and zLen for A, C and D to be set to 0 and the data block B and E to be moved to the beginning of the segment 320 so that the remaining blocks can be freed. However, for ILD FSR, the VBM list will not be compacted as ILD requires the VBM list index to remain the same for each valid element in order to avoid a potential data mismatch (DMC) scenario. For example, if the VBM 310 was compacted as part of ILD FSR, the offset B and offset E would correspond to idx:0 and idx:1, respectfully. Subsequently, if there was a read from MP Offset-B1, the idx in MP-B1 would still be pointing to idx:1 but the said index would be mapped to data block E after the compaction of the VBM and the segment 320.

Additionally, the techniques as described herein are configured to avoid another potential DMC scenario caused by the traditional FSCK approaches to rebuilding VBM after FSR compaction. As discussed above, in this embodiment, data block B and E are moved to the beginning of the segment 320 so that the remaining blocks can be freed. However, the movement of the blocks B and E to the beginning of the segment 320 results in the loss of idx information related to the blocks B and E. For example, if the file system is put offline to rebuild the VBM (e.g., VBM lost write or VBM internal CRC mismatch), the traditional FSCK approach would rebuild the extents based on the sequence that the data blocks appear in ZipHeader. In this embodiment, the traditional FSCK approach would rebuild the VBM based on the sequence of data block B and E such that the offset B and offset E would correspond to idx:0 and idx:1, respectfully. It should be understood that this would cause a DMC in the event there was a read from MP Offset-B1 after the said rebuild as the idx in MP-B1 would still be pointing to idx:1 but the said index would be mapped to data block E. The techniques as described in FIG. 3D solves this potential DMC scenario.

Figure 3D:
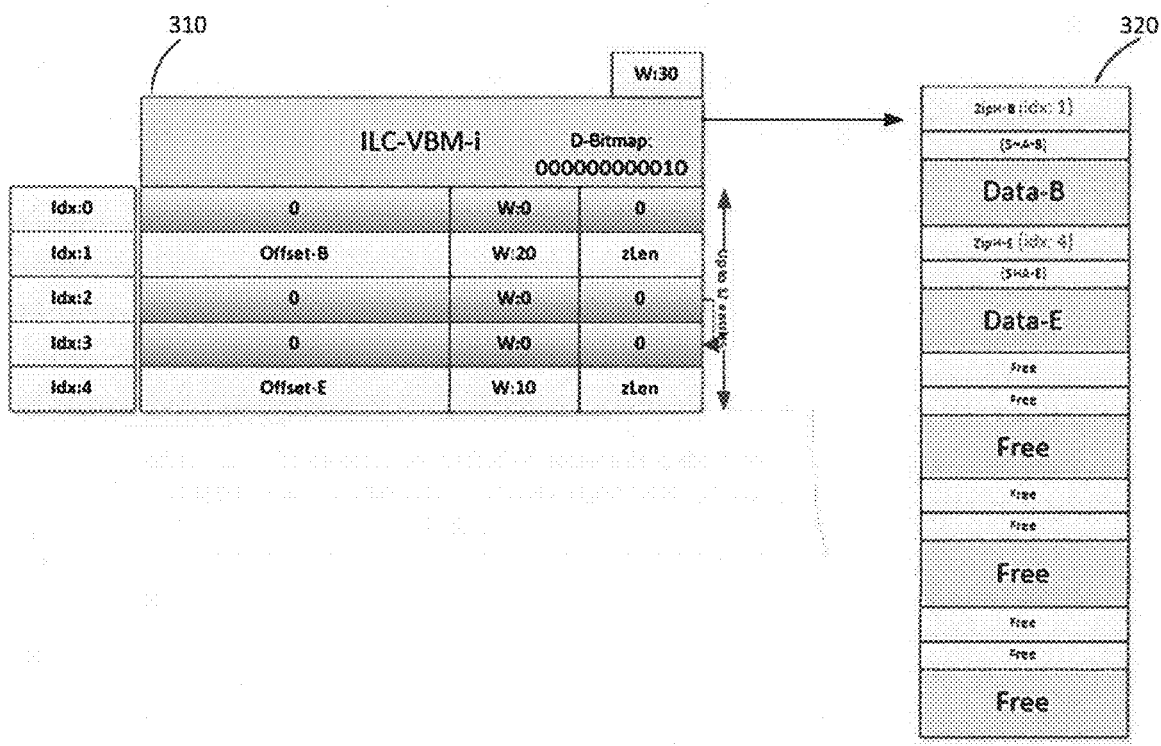

FIG. 3D illustrates another stage in managing data storage. In this particular embodiment, the figure illustrates the layout of VBM 310 and the segment 320 in response to the deployment of ILD FSR. In this particular embodiment, the ILD FSR comprises providing index information in the respective ZipHeaders of the segment 320. Now, in the event that VBM CRC is bad, FSCK will rebuild the VBM extents based on ZipHeader information in the segment 320. For example, a reserved field in ZipHeader may record the idx of the extent in VBM related to that particular data block so that a later FSCK knows which extent slot to put the rebuilt extent when VBM is marked as corrupted.

Figure 4:
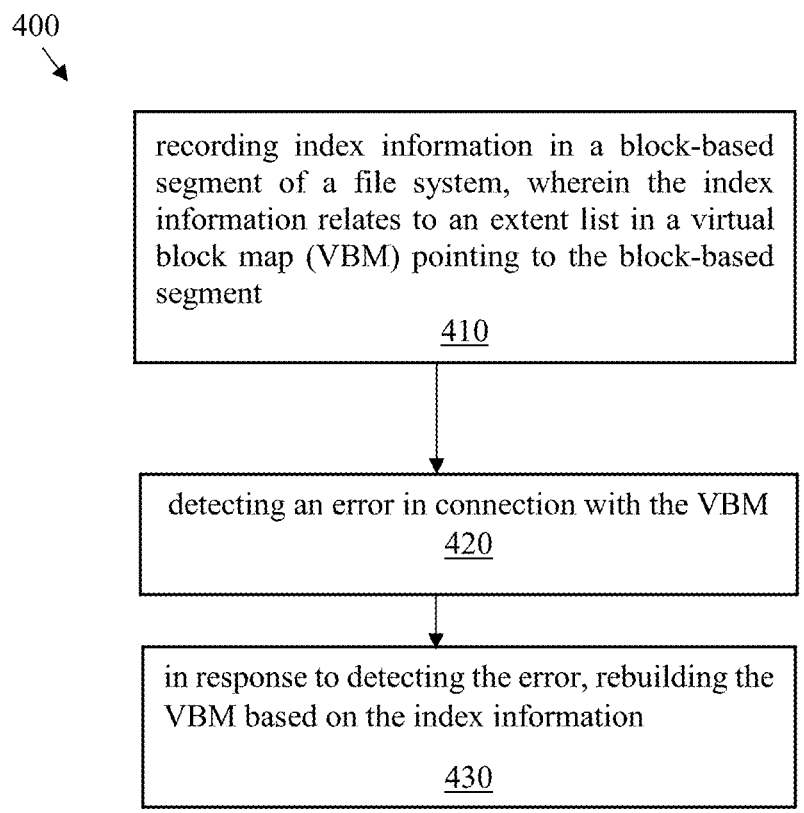
FIG. 4 is a flowchart showing an example method that may be used in connection with techniques herein according to an exemplary embodiment of the disclosure.

FIG. 4 shows an example method 400 that may be carried out in connection with the system 116. The method 400 typically performed, for example, by the software constructs described in connection with FIG. 1, which reside in the memory 130 of the storage processor 120 and are run by the processing circuitry/processing unit(s) 124. The various acts of method 400 may be ordered in any suitable way. Accordingly, embodiments may be constructed in which acts are performed in orders different from that illustrated, which may include performing some acts simultaneously.

At step 410, recording index information in a block-based segment of a file system, wherein the index information relates to an extent list in a virtual block map (VBM) pointing to the block-based segment. At step 420, detecting an error in connection with the VBM. At step 430, in response to detecting the error, rebuilding the VBM based on the index information.

The foregoing applications and associated embodiments should be considered as illustrative only, and numerous other embodiments can be configured using the techniques disclosed herein, in a wide variety of different applications.

It should also be understood that the disclosed techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as data storage system 116, or portions thereof, are illustratively implemented for use by tenants of such a multi-tenant environment.

Cloud infrastructure as disclosed herein can include cloud-based systems such as AWS, GCP and Microsoft Azure™. Virtual machines provided in such systems can be used to implement at least portions of data storage system 116 in illustrative embodiments. The cloud-based systems can include object stores such as Amazon™ S3, GCP Cloud Storage, and Microsoft Azure™ Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
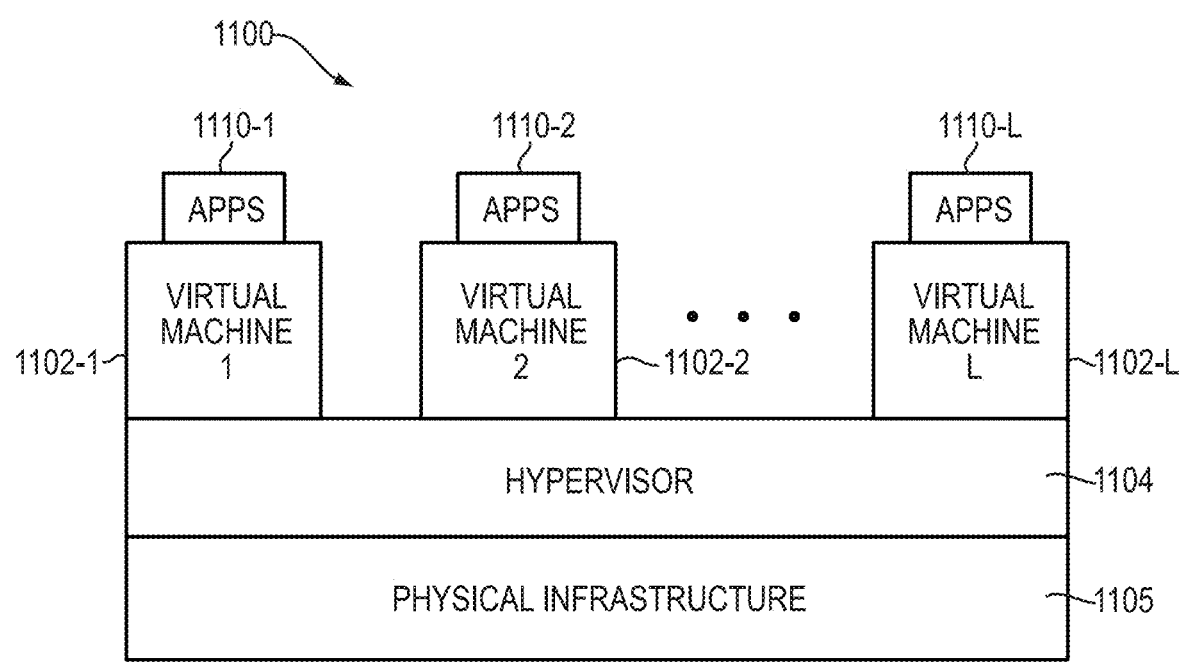
FIG. 5 illustrates an exemplary processing platform that may be used to implement at least a portion of one or more embodiments of the disclosure comprising a cloud infrastructure.

Referring now to FIG. 5, one possible processing platform that may be used to implement at least a portion of one or more embodiments of the disclosure comprises cloud infrastructure 1100. The cloud infrastructure 1100 in this exemplary processing platform comprises virtual machines (VMs) 1102-1, 1102-2, . . . 1102-L implemented using a hypervisor 1104. The hypervisor 1104 runs on physical infrastructure 1105. The cloud infrastructure 1100 further comprises sets of applications 1110-1, 1110-2, . . . 1110-L running on respective ones of the virtual machines 1102-1, 1102-2, . . . 1102-L under the control of the hypervisor 1104.

The cloud infrastructure 1100 may encompass the entire given system or only portions of that given system, such as one or more of client, servers, controllers, or computing devices in the system.

Although only a single hypervisor 1104 is shown in the embodiment of FIG. 5, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 1104 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products, such as VNX™ and Symmetrix VMAX™, both commercially available from Dell EMC. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed systems may each run on a computer, server, storage device or other processing platform element. A given such element may be viewed as an example of what is more generally referred to herein as a "processing device." The cloud infrastructure 1100 shown in FIG. 5 may represent at least a portion of one processing platform.

Figure 6:
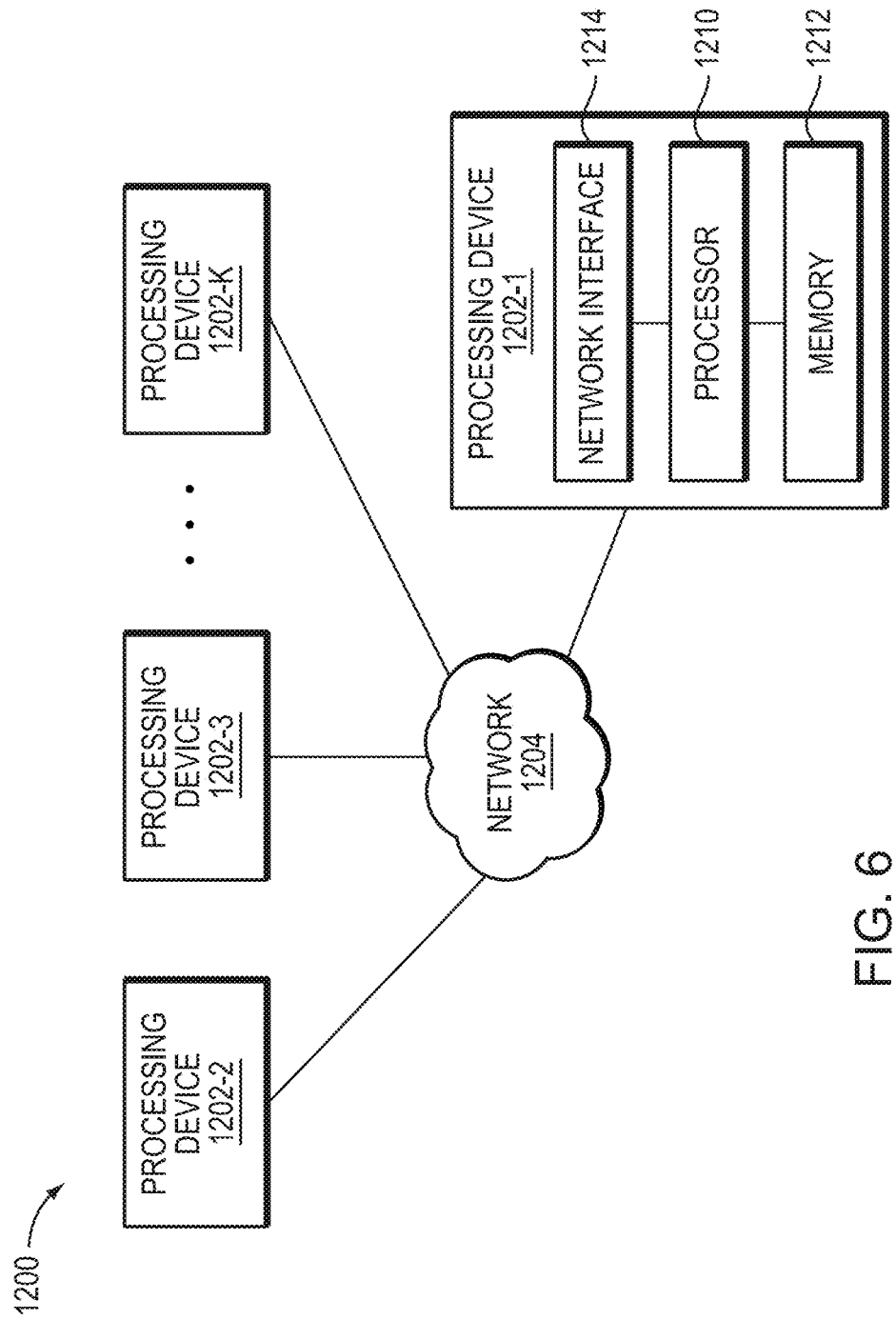
FIG. 6 illustrates another exemplary processing platform that may be used to implement at least a portion of one or more embodiments of the disclosure.

Another example of a processing platform is processing platform 1200 shown in FIG. 6. The processing platform 1200 in this embodiment comprises at least a portion of the given system and includes a plurality of processing devices, denoted 1202-1, 1202-2, 1202-3, . . . 1202-K, which communicate with one another over a network 1204. The network 1204 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1202-1 in the processing platform 1200 comprises a processor 1210 coupled to a memory 1212. The processor 1210 may comprise a microprocessor, a microcontroller, an application specific integrated circuit (ASIC), a field programmable gate array (FPGA) or other type of processing circuitry, as well as portions or combinations of such circuitry elements, and the memory 1212, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device.

It should again be emphasized that the above-described embodiments are presented for purposes of illustration only. Many variations and other alternative embodiments may be used. For example, the disclosed techniques are applicable to a wide variety of other types of information processing systems, compute services platforms, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   recording index information in a block-based segment of a file system, wherein the index information relates to an extent list in a virtual block map (VBM) pointing to the block-based segment;
   detecting an error in connection with the VBM, wherein detecting the error includes analyzing a bitmap including one or more bits, wherein each bit represents an extent having been involved with deduplication; and
   in response to detecting the error, rebuilding the VBM based on the index information.

2. The method as claimed in claim 1, wherein the index information is recorded in respective headers of data stored in storage extents of the block-based segment.

3. The method as claimed in claim 1, wherein the index information describes the order of respective entries in the extent list.

4. The method as claimed in claim 1, wherein the index information describes the positioning of respective entries in the extent list that include location information relating to storage extents in the block-based segment.

5. The method as claimed in claim 1, wherein the recording of the index information is part of a filesystem reorganizer (FSR) compaction that compacts the block-based segment.

6. The method as claimed in claim 1, wherein the rebuilding of the VBM is part of a file system checking (FSCK) procedure.

7. An apparatus, comprising:
   memory; and
   processing circuitry coupled to the memory, the memory storing instructions which, when executed by the processing circuitry, cause the processing circuitry to:
      record index information in a block-based segment of a file system, wherein the index information relates to an extent list in a virtual block map (VBM) pointing to the block-based segment;
      detect an error in connection with the VBM, wherein detecting the error includes analyzing a bitmap including one or more bits, wherein each bit represents an extent having been involved with deduplication; and
      in response to detecting the error, rebuild the VBM based on the index information.

8. The apparatus as claimed in claim 7, wherein the index information is recorded in respective headers of data stored in storage extents of the block-based segment.

9. The apparatus as claimed in claim 7, wherein the index information describes the order of respective entries in the extent list.

10. The apparatus as claimed in claim 7, wherein the index information describes the positioning of respective entries in the extent list that include location information relating to storage extents in the block-based segment.

11. The apparatus as claimed in claim 7, wherein the recording of the index information is part of a filesystem reorganizer (FSR) compaction that compacts the block-based segment.

12. The apparatus as claimed in claim 7, wherein the rebuilding of the VBM is part of a file system checking (FSCK) procedure.

13. A computer program product having a non-transitory computer readable medium which stores a set of instructions, the set of instructions, when carried out by processing circuitry, causing the processing circuitry to perform a method of:

recording index information in a block-based segment of a file system, wherein the index information relates to an extent list in a virtual block map (VBM) pointing to the block-based segment;

detecting an error in connection with the VBM, wherein detecting the error includes analyzing a bitmap including one or more bits, wherein each bit represents an extent having been involved with deduplication; and in response to detecting the error, rebuilding the VBM based on the index information.

14. The computer program product as claimed in claim 13, wherein the index information is recorded in respective headers of data stored in storage extents of the block-based segment.

15. The computer program product as claimed in claim 13, wherein the index information describes the order of respective entries in the extent list.

16. The computer program product as claimed in claim 13, wherein the index information describes the positioning of respective entries in the extent list that include location information relating to storage extents in the block-based segment.

17. The computer program product as claimed in claim 13, wherein the recording of the index information is part of a filesystem reorganizer (FSR) compaction that compacts the block-based segment.

18. The computer program product as claimed in claim 13, wherein the rebuilding of the VBM is part of a file system checking (FSCK) procedure.

\* \* \* \* \*